United States Patent [19]
Keyser

[11] 3,879,067
[45] Apr. 22, 1975

[54] PIPE JOINT
[75] Inventor: Lewis R. Keyser, Dayton, Ohio
[73] Assignee: Price Brothers Company, Dayton, Ohio
[22] Filed: Feb. 2, 1973
[21] Appl. No.: 329,217

Related U.S. Application Data
[62] Division of Ser. No. 200,936, Nov. 22, 1971, Pat. No. 3,744,806.

[52] U.S. Cl. ................ 285/110; 285/189; 285/230
[51] Int. Cl. .............................................. F16l 5/02
[58] Field of Search .......... 285/110, 230, 231, 379, 285/192, 189; 52/21, 22; 137/363; 277/DIG. 2, 162, 152, 189

[56] References Cited
UNITED STATES PATENTS

| | | | |
|---|---|---|---|
| 2,432,592 | 12/1947 | Stecher et al. | 285/379 X |
| 2,451,070 | 10/1948 | Chamberlain | 285/230 X |
| 2,953,398 | 9/1960 | Haugen et al. | 285/231 X |
| 3,372,942 | 3/1968 | Carter | 285/379 X |
| 3,544,119 | 12/1970 | Glover | 285/379 X |
| 3,787,061 | 1/1974 | Yoakum | 285/110 X |

FOREIGN PATENTS OR APPLICATIONS

| | | | |
|---|---|---|---|
| 1,118,551 | 11/1961 | Germany | 285/110 |
| 1,545,368 | 9/1968 | France | 285/231 |
| 1,218,062 | 1/1971 | United Kingdom | 285/230 |
| 200,867 | 11/1958 | Germany | 285/231 |

*Primary Examiner*—Thomas F. Callaghan
*Attorney, Agent, or Firm*—Biebel, French & Bugg

[57] ABSTRACT

A joint between a manhole riser and a pipe feeding into the manhole includes a resilient gasket embedded in the riser and projecting radially into the opening through the wall of the riser to provide a seal against the outer surface of the intersecting pipe. Wire hoops are received in continuous grooves in the gasket to both stretch it outwardly and resist rolling of the gasket as the intersecting pipe is installed. Additionally, the opening through the riser wall includes an annular, inwardly projecting shoulder designed to support the intersecting pipe should the pipe shift with the respect to the riser, to thereby avoid the loss of seal that would result if the gasket itself supported the entire shear load.

8 Claims, 6 Drawing Figures

PATENTED APR 22 1975

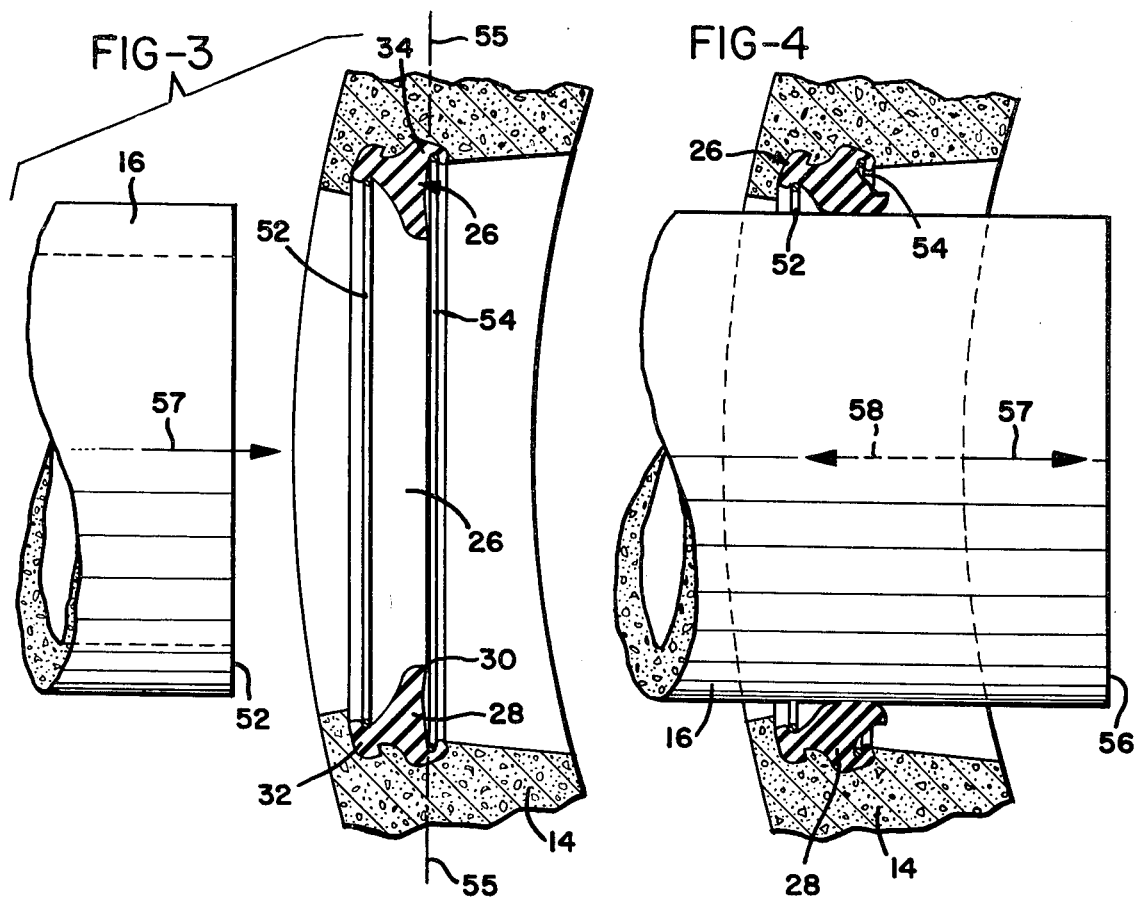
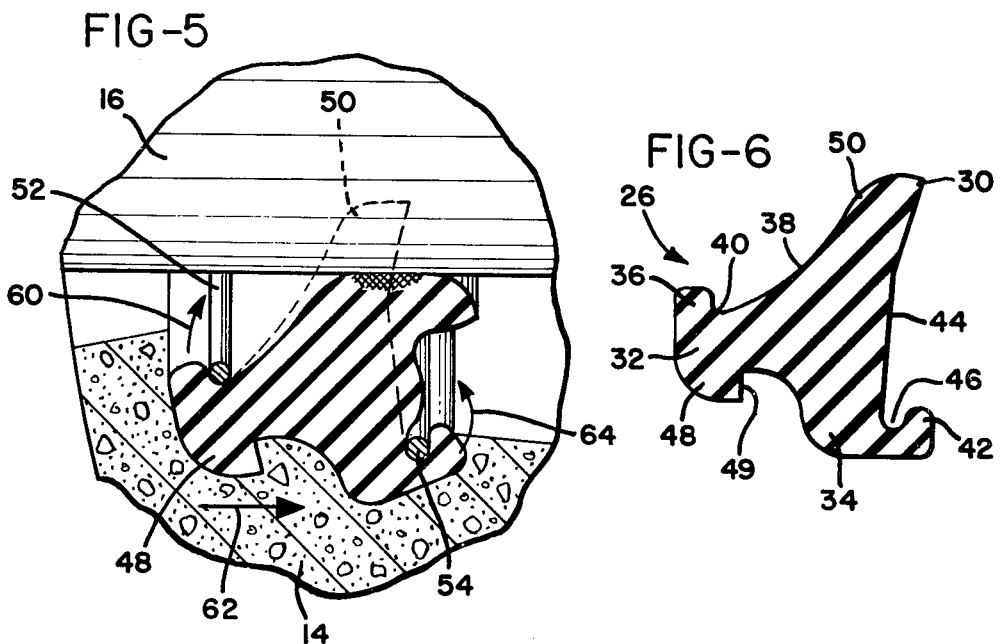

PIPE JOINT

This is a division of application Ser. No. 200,936, filed Nov. 22, 1971, and now U.S. Pat. No. 3,744,806.

BACKGROUND OF THE INVENTION

The construction of a satisfactory joint between two pipes sections, such as a manhole riser and intersecting feed pipe, presents several problems. Because the joint will usually be made in a ditch or trench where there is limited working room it is desirable that the joint be one that is relatively easy to assemble. At the same time, it is necessary that the joint not only provide a seal against the flow of liquids out of the riser but, more importantly, that the infiltration of ground water into the manhole be avoided. Additionally, joints of this type are frequently subjected to rather severe shear loads caused by shifting of the joint components with respect to each other, as a result of which the integrity of the seal at the joint is lost.

Various attempts have been made to cope with these problems. For example, one rather common type of joint utilizes an O-ring positioned about the intersecting pipe and expanded by compression into contact with the internal walls of the manhole. This type of construction, however, may be difficult to install under field conditions, generally requiring clamps and the like to compress the O-ring into sealing relationship with the adjacent pipe surfaces.

Other types of joints utilize bushing-like resilient sleeves mounted in the opening into the manhole riser and adapted to engage the outer surface of the intersecting pipe. While joints of this type may not require external clamping members to form a seal, they do require fairly close tolerance between the outside diameter of the intersecting pipe and the diameter of the opening through the riser and are subject to loss of seal through shifting of the joint components.

SUMMARY OF THE INVENTION

The present invention provides a resilient gasket which is readily fabricated and cast in the wall of a manhole riser or the like to provide a resilient seal between an opening through the wall and the outside surface of an intersecting pipe. The opening through the riser wall is provided with an offset which defines an inwardly projecting shoulder adjacent the outer surface of the riser wall and the resilient gasket is embedded in the riser with portions anchoring it in the wall of the riser but with a sealing portion projecting radially inwardly of the opening past the shoulder.

Thus, the gasket engages the outside surface of the intersecting pipe and the compression of the gasket between the pipe and wall of the opening provides a tight seal, while the above noted, inwardly projecting shoulder provides resistance to shear loads imposed on the joint by relative shifting of the joint components. Additionally, the present invention permits the formation of a tight seal even though there is some deflection of the intersecting pipe from the perpendicular to the axis of the riser.

The gasket itself includes a substantially triangularly shaped main section with a first apex of the main section projecting inwardly of the opening and defining a sealing portion of the gasket. At a second apex of the main section adjacent the outer surface of the riser an outer lip is provided, defining with the outer face of the gasket extending between the first and second apices of the main section, an outer groove. A fairly stiff wire hoop is received in this groove and serves, when the intersecting pipe is pushed through the opening in the riser, to prevent the gasket from rolling on itself and becoming disengaged from its embedment in the wall of the riser.

At a third apex of the main section an inner lip is provided which defines with an inner face of the main section extending between the first and third apices a groove which receives a second relatively stiff wire hoop. The gasket is also stretched over this hoop, which then serves to prevent the gasket from rolling in the opposite direction as the intersecting pipe is shifted outwardly to make a joint at its opposite end with a preceeding pipe section.

Also at the second apex of the main section an anchoring lip projects in a direction opposite to the direction of projection of the outer lip and engages in a continuous annular socket formed in that portion of the riser defining the opening therethrough. This anchoring lip has a substantially flat face which engages a similar face of the socket and resists lateral shifting of the gasket inwardly of the manhole riser as the intersecting pipe is pushed therethrough.

Additionally, the outer sloping face of the main section, adjacent the first apex thereof, is provided with a convex portion which facilitates conformation of the resilient gasket with the outer surface of the intersecting pipe to provide a firm seal between the gasket and the pipe.

By forming the gasket with a relatively thick, triangularly, shaped, main sealing section a much more rugged seal is provided as well as one which is better adapted than the bushing type constructions of the prior art to prevent water infiltration through the seal. However, the offset portion of the opening through the wall of the riser permits the sealing section of the gasket, even though relatively thick, to deform by, in effect, flowing, inwardly into the offset portion of the opening. In this way a wider range of variations from nominal pipe size may be accommodated while still providing an effective seal.

BRIEF DESCRIPTION OF THE DRAWINGS

FIG. 3 is a view similar to FIG. 2 showing one step in the formation of the joint;

FIG. 4 is a view similar to FIG. 3 showing a second step in the joint assembly;

FIG. 5 is an enlarged view of a portion of FIG. 2; and

FIG. 6 is an enlarged cross sectional of the gasket per se.

DESCRIPTION OF THE PREFERRED EMBODIMENT

Figure 1:
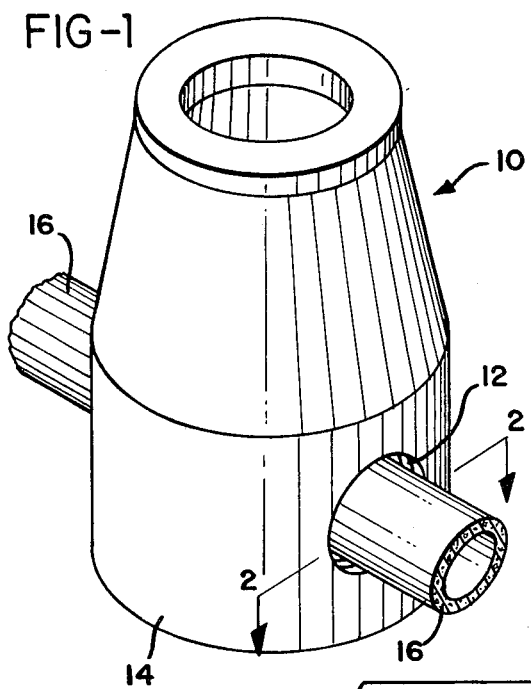
FIG. 1 is a perspective view showing a typical environment in which the present invention is used.

A joint in accordance with the present invention finds particular utility in joining two sections of conduit, such as a manhole riser and an intersecting feed pipe. Thus, as seen in FIG. 1 of the drawings, a manhole riser 10 is provided with an opening 12 through a wall 14 thereof through which projects an intersecting feed pipe 16.

Figure 2:
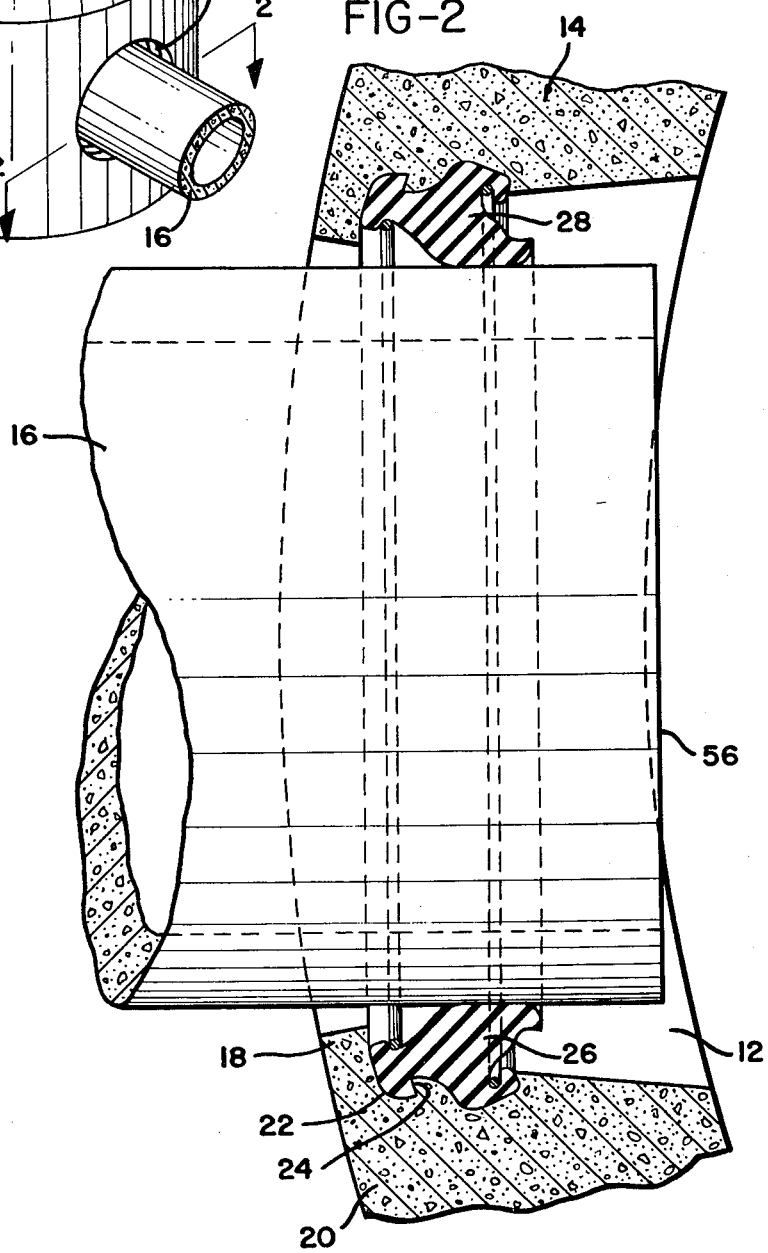
FIG. 2 is a plan view, partly in section, showing a joint in accordance with the present invention.

The opening 12, as seen in FIG. 2 of the drawings, has an offset portion defining a radially inwardly projecting annular shoulder 18 adjacent outer surface 20 of the riser 10. Additionally, another portion of the wall of the opening 12 defines a continuous slot 22 having an undercut flat face 24. Mounted in the wall of the opening 12 is a gasket 26 in the form of an endless belt, which is shown in FIGS. 3 and 6 of the drawings in its undistorted configuration.

The gasket 26 includes a substantially triangular shaped main section 28 having first, second and third apices 30, 32 and 34, respectively. The first apex 30 constitutes a radially inwardly projecting sealing portion which projects inwardly of the opening 12 past the inwardly projecting shoulder 18. An outer lip 36 extends from the second apex 32 of the gasket and defines with a portion of an outer face 38 extending between the first and second apices 30 and 32, a continuous groove 40.

An inner lip 42 extends from the third apex 34 of the main section and defines with an inner face 44 extending between apices 30 and 34 a second groove 46. Additionally, an anchoring lip 48 having a flat face 49 also projects from the second apex 32 of the main section and, as seen in FIGS. 2 and 5, is received in the socket 22 with the faces 24 and 49 engaging each other. The outer face 38 of the main section 28 is provided with a convex portion 50 at a point thereon adjacent the first apex 30.

In fabricating the gasket 26 it is convenient to form it as a continuous extruded section and then cut the section to the desired length and cement the severed ends to each other to form an endless belt. In so doing it will be apparent that the inner circumference of the gasket will be placed in compression to the extent that there may be some buckling and distortion of the gasket, particularly in the region of the apex 30.

Partly to overcome this and also to improve the stability of the unit when it is installed, as will be described in more detail below, a relatively rigid reinforcing member in the form of a wire hoop 52 is positioned in the groove 40 by stretching the gasket 26 to extend the gasket sufficiently to overcome any buckling that may occur around the inner circumference thereof. Similarly, a second, wire endless hoop 54 is received in the groove 46.

With the gasket 26 extended about the two hoops 52 and 54 the complete assembly is so positioned by means of suitable jigs that when concrete, for example, is cast about the gasket the inner face 44 thereof will be substantially in a plane 55, as seen in FIG. 3 of the drawings. In this way the greatest thickness of gasket material is positioned along a plane intersecting the axis of pipe 16 perpendicularly thereof, whereby maximum sealing with the pipe surface, as indicated by cross hatching in FIG. 5, as well as the opening, is obtained.

With a manhole having the gasket embedded therein installed in the field, a feed pipe 16 may be connected thereto as follows. Generally, a string of pipe sections will have been joined together to a point just short of the manhole 10. The last section of pipe 16 is then positioned in the trench containing the pipe line and its end 56 thrust forwardly through the opening 12 in the wall of the manhole in the direction indicated by the arrow 57 in FIGS. 3 and 4 of the drawings. The end 56 of the pipeline will be thrust inwardly into the riser a distance sufficient to allow its opposite end, not shown, to clear the end of the last pipe section in the pipe line. At this point the end 56 of the pipe 16 will be in the position shown in FIG. 4 of the drawings.

Thereafter, the pipe 16 is retracted in the direction indicated by the arrow 58 in FIG. 4 of the drawings to allow a joint to be made between the opposite end of the pipe 16 and the adjacent end of the last pipe section in the pipe line. At this point the end 56 of the pipe will assume a position substantially as shown in FIG. 2 of the drawings.

In the process of assembling the pipe 16 in the manner described above several different forces will be acting upon the gasket 26. Thus, as the pipe 16 is thrust into the manhole 10 there will be a tendency for the outer lip 36 to lift upwardly as indicated by the arrow 60 in FIG. 5 of the drawings. At the same time there will be a tendency for the entire gasket to slide inwardly of the riser in the direction indicated by the arrow 62.

It will be apparent that the first of these forces is effectively resisted by the relatively rigid wire hoop 52 which reacts outwardly against the tendency of the lip 36 to roll inwardly of the opening 12. At the same time, the flat face 49 of the anchoring lip 48, received in the slot 22 and bearing against the complementary face 24 of the undercut portion, resists the tendency for the entire gasket to slide inwardly into the manhole.

It will also be noted that the sloping outer surface 38 facilitates insertion of the pipe 16 through the gasket and that the convex portion 50 positioned near the apex 30 enhances the flexing of the gasket to the position shown in FIGS. 2, 4 and 5 of the drawings. As the gasket flexes it behaves somewhat like an incompressible fluid and flows to accommodate displacement by the pipe 16. This "flowing" is accommodated by the undercut portion of the opening, as seen in FIG. 5 of the drawings, while a tight seal is formed, not only with the pipe 16 but with the surface of the opening 12. It will also be seen that the configuration of that section of the gasket embedded in the riser and the complementary section of the opening 12 provide a tortuous path against the penetration of moisture into the manhole.

Preferably the outer face 38 of the gasket will be lubricated with a suitable lubricant, such as a vegetable soap, and when the pipe 16 is retracted in the direction indicated by the arrow 58 in FIG. 4 of the drawings, it will merely slide along the outer face of the gasket. However, as it does, there will be a tendency for the inner lip 42 to roll inwardly in the direction indicated by the arrow 64 in FIG. 5 of the drawings. This tendency is effectively resisted by the relatively rigid wire hoop 54 received in the groove 46.

From the above it will be apparent that the gasket 26 permits ready installation of the feed pipe 16 in the opening in the manhole riser 10. To form the joint it is merely necessary to insert the end 56 of the pipe 16 through the opening 12 to the position shown in the FIG. 4 of the drawing, then retract the pipe to the position as shown in FIG. 2 of the drawings to make the joint with the last preceding section of pipe installed. No external fasteners, such as nuts or bolts, are required, yet the relatively thick sealing section provided by the substantially triangular shape of the main section of the gasket provides a water tight seal around the opening through the manhole wall.

It will be noted that despite the relatively thick main section, the gasket is readily flexed because the offset portion of the opening 12 accommodates "flowing" of the gasket material when a pipe 16 is installed. At the same time a water tight seal is formed, even though variations in the intersecting pipe diameter from the nominal diameter thereof are encountered. In operation it has been found, in distinction to prior art sealing devices of, for example, the bushing type, a satisfactory seal is provided despite variations of a half inch in diameter from nominal pipe sizes.

Additionally, the pipe 16 need not intersect the riser exactly perpendicularly to the axis of the riser. In practice it has been found that with the gasket of the present invention the intersecting pipe can be deflected as much as 10° from the perpendicular and a good seal maintained.

The installed assembly will also be subjected to relatively heavy shear loads due to relative movement between the pipe and the manhole riser occurring after installation. In prior connections of this type a shifting of the pipe 16 radially of the opening would usually result in one portion of the gasket becoming compressed, while the wall of the pipe separated from the gasket at a point diametrically opposed to the point where the greatest compression of the gasket occurs, thereby permitting infiltration and exfiltration into and out of the manhole.

In the present construction, however, the inwardly projecting shoulder 18 will take the shear load generated by relative movement between the pipe 16 and the manhole riser. Thus, after an initial amount of relative movement, the outer surface of the pipe 16 will contact the inwardly projecting shoulder 18 and thereby prevent separation of the outer surface of the pipe from the gasket at a point opposite that point where the greatest compression of the gasket has occurred.

While a variety of materials are capable of use in forming the gasket of the present invention, a resilient material having a Durometer hardness on the Shore A scale of 40 to 60 is desirable with a material having a hardness of approximately 50 being optimum. Additionally, any suitable material may be utilized for the relatively rigid reinforcing rings 52 and 54, but an 8 gage steel wire has been satisfactory.

Regardless of the specific material that is used, however, it will be seen that the present invention provides a water tight seal between a pipe member and an opening through a wall which is readily fabricated and installed and resistant to destruction by the imposition of heavy shear loads on the joint.

While the form of apparatus herein described constitutes a preferred embodiment of the invention, it is to be understood that the invention is not limited to this precise form of apparatus, and that changes may be made wherein without departing from the scope of the invention.

What is claimed is:
1. A joint comprising:
   a. a substantially imperforate wall,
   b. means defining an opening through said wall,
   c. portions of said wall being offset and defining a radially inwardly projecting annular shoulder,
   d. a resilient, annularly shaped gasket mounted in said opening,
   e. said gasket in cross section including a substantially triangular main section,
   f. a first apex of said main section defining a sealing portion of said gasket.
   g. a second apex of said main section positioned in said wall adjacent an outer surface thereof,
   h. an outer lip extending from said second apex inwardly of said opening in said wall,
   i. said outer lip and an outer face of said main section extending between said first and second apexes defining a first groove,
   j. a first relatively rigid reinforcing member received in said first groove and preventing dislocation of said second apex radially inwardly of said opening,
   k. an inner lip extending from a third apex of said main section,
   l. said inner lip and an inner face of said main section extending between said first and third apexes defining a second groove,
   m. a second relatively rigid reinforcing member received in said second groove and preventing movement of said third apex radially inwardly of said opening,
   n. anchoring portions of said gasket being anchored in said wall radially outwardly of said shoulder, and
   o. said sealing portion of said gasket projecting radially inwardly of said opening beyond said annular shoulder.

2. The joint of claim 1 wherein:
   a. said outer face of said main section is convex at a point adjacent said first apex.

3. In a joint including a manhole riser having internal and external surfaces and a further surface defining a pipe receiving opening through a wall of said riser from said internal surface to said external surface, a pipe section intersecting said riser at substantially right angles to the longitudinal axis thereof with an end of said pipe section received in said opening and a gasket interposed between an outside surface of said end of said pipe section and opposing portions of said surface of said riser defining said opening therethrough, the improvement comprising:
   a. a said gasket having:
      i. a main section,
      ii. a sealing portion, and
      iii. an anchoring portion,
   b. said surface defining said opening comprising:
      i. a main section,
      ii. a gasket engaging section, and
      iii. shoulder section,
   c. said shoulder section of said surface projecting radially inwardly a greater distance than said main section and said gasket engaging section,
   d. said anchoring portion of said gasket being imbedded in said wall radially outwardly of said main section and said shoulder section of said opening defining surface,
   e. the internal diameter of said shoulder section of said surface being greater than the external diameter of said end of said pipe and adapted to engage said end of said pipe upon relative shifting movement of said opening defining surface and said end of said pipe in directions other than parallel to the length of said pipe,
   f. said main section of said gasket being disposed within said opening with portions of said main section of said gasket disposed radially outwardly of said inwardly projecting shoulder section of said opening defining surface and interconnecting said anchoring portion and said sealing portion of said gasket, g. said sealing portion of said gasket projecting radially inwardly from said main section of said gasket and engaging said outside surface of said pipe in sealing relationship thereto, and h. said sealing portion of said gasket, prior to insertion of said end of said pipe into said opening in said riser, projecting radially inwardly of said opening beyond said radially inwardly projecting shoulder section of said surface and having an internal diameter less than said external diameter of said pipe, whereby said sealing portion of said gasket engages said end of said pipe in said sealing relationship thereto and maintains said sealing relationship even upon said relative shifting movement of said opening defining surface and said end of said pipe and consequent engagement of said shoulder by said pipe.

4. The joint of claim 3 wherein:
a. said main section of said gasket is substantially triangular in cross section, and
b. a first apex of said main section defines said sealing portion of said gasket.

5. The joint of claim 4 wherein:
a. said triangular main section of said gasket includes an inner face which prior to said insertion of said pipe end lies in a plane extending substantially parallel to the longitudinal axis of said manhole riser.

6. The joint of claim 4 further comprising:

a. a second apex of said main section disposed adjacent said external surface of said riser,
b. an outer lip of said gasket projecting from said second apex inwardly of said opening defining surface in said wall of said riser,
c. said outer lip and an outer face of said main section extending between said first and second apices defining a first groove, and
d. a first, relatively rigid reinforcing hoop received in said first groove and preventing dislocation of said second apex of said gasket radially inwardly of said opening.

7. The joint of claim 6 wherein:
a. said anchoring portion of said gasket includes an anchoring lip projecting from said second apex of said gasket into said riser wall in a direction substantially opposite to the direction of projection of said outer lip, and
b. means defining a socket extending radially outwardly from said opening defining surface and receiving said anchoring lip.

8. The joint of claim 4 wherein:
a. said substantially triangular main section of said gasket includes an outer face sloping radially outwardly of said opening from said first apex toward said external surface of said wall, and
b. said outer face is convex adjacent said first apex.

* * * * *